Nov. 6, 1934.　　　　　R. B. WASSON　　　　　1,979,512
LOGARITHMIC CALCULATING MECHANISM
Original Filed Nov. 20, 1925　　2 Sheets-Sheet 1

INVENTOR
Robert B. Wasson
BY
Haguet & Neary  ATTORNEYS

Nov. 6, 1934. R. B. WASSON 1,979,512
LOGARITHMIC CALCULATING MECHANISM
Original Filed Nov. 20, 1925    2 Sheets-Sheet 2
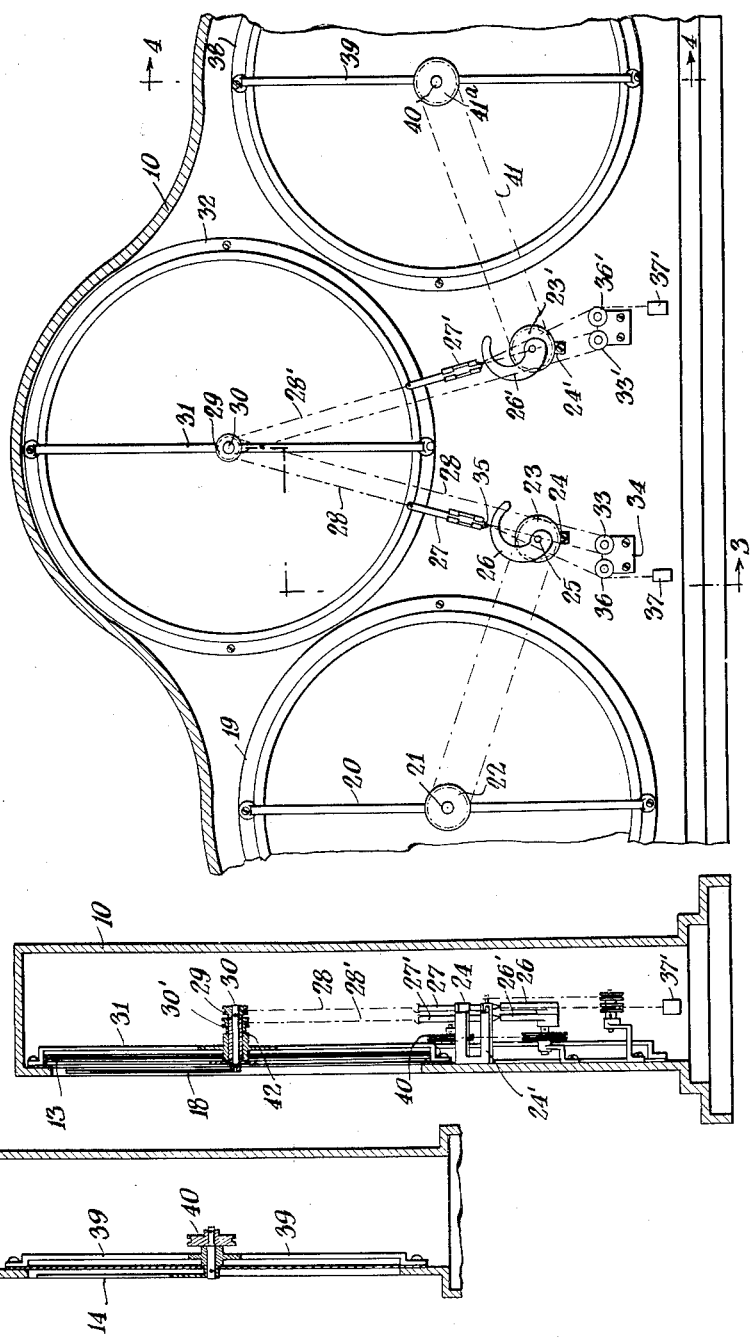
INVENTOR
Robert B. Wasson
BY
Hoguet & Neary  ATTORNEYS Patented Nov. 6, 1934

1,979,512

UNITED STATES PATENT OFFICE 1,979,512

LOGARITHMIC CALCULATING MECHANISM

Robert B. Wasson, Cranford, N. J.

Continuation of application Serial No. 70,424, November 20, 1925. This application June 12, 1930, Serial No. 460,579

1 Claim. (Cl. 235—61)

My invention relates to improvements in indicating devices and more particularly logarithmic calculating mechanisms or instruments, which for convenience I have called calculating devices. In this type of calculating device different factors operate a mechanism which indicates a desired resultant of the factors.

Many attempts have been made in the prior art to obtain an instrument which will give continuously a desired resultant of certain determinable and perhaps continuously changing factors. However, such instruments have been limited in their use to a relatively small group of factors. Indicators of resultants of most of the factors have not been accurate, but rather give resultants which are only approximations of the actual value desired.

One of the primary objects of my invention is to overcome the disadvantages outlined above.

Another object of my invention is to obtain a continuously indicated resultant from one or more continuously varying factors.

A further object of my invention is to obtain means for continuously or otherwise indicating an accurate resultant of one or more varying factors.

Other objects and advantages of my invention will become apparent from the following description and drawings.

My device consists in the use of co-acting movable elements as, for example, a moving dial with a co-acting movable pointer, which co-acting movable elements are each individually operated by a mechanism which causes a displacement or movement of the respective co-acting movable element, which movement is proportional to a logarithm of one of the varying factors of the computation. It is, of course, possible to have more than 2 factors inasmuch as several factors may be used to give a resultant and this resultant then used as a single factor to bring about the displacement of the co-acting movable elements. In using a dial and pointer arrangement as the indicating elements, the dial may be graduated logarithmically. In this case when the hand and dial are caused to move in opposite directions, the product of the two factors, one or both of which may or may not be continuously changing, will be indicated by the pointer on the dial. The quotient of the two varying factors may be obtained by causing the pointer and dial to move in the same direction.

It is imperative in this type of mechanism, that there be straight line motion so that the logarithmic scales are added or subtracted. Therefore, mechanisms that do not give true straight line motions are inoperative as far as giving a final reading from the addition or subtraction of logarithms or values proportional to them.

In my device the contributing factors and the result desired may be constantly varied and therefore, I employ means to continuously insure the correct displacement of the indicating elements in the graduation of the dial. For example, provision may be made to care for the effect of other constantly multiplying and dividing factors.

For the sake of example, I have shown my device as applied to a continuous horse power indicator and have also shown a torque meter and speed meter which indicate the contributing factors to the horse power meter. In practice I prefer to group the horse power indicator, the torque indicator and the speed indicator or tachometer so that the three may be observed at a glance, and the comparative as well as the final reading easily made. I have shown the hand of the horse power indicator moved by one of the factors and the dial of the horse power indicator moved by another of the factors. The drawings disclose a means for carrying this out, but it will be understood that various other means are possible without departing from my invention. For example, the logarithmic displacement may be applied directly to the co-acting movable elements of the resultant indicator.

Reference is to be had to the accompanying drawings forming a part of this specification, in which similar reference characters indicate corresponding parts in all the views.

Figure 2 is a broken sectional rear elevation thereof showing the operating mechanism.

Figure 3 is a cross section on the line 3—3 of Figure 2, and

Figure 4 is a cross section on the line 4—4 of Figure 2.

Figure 1:
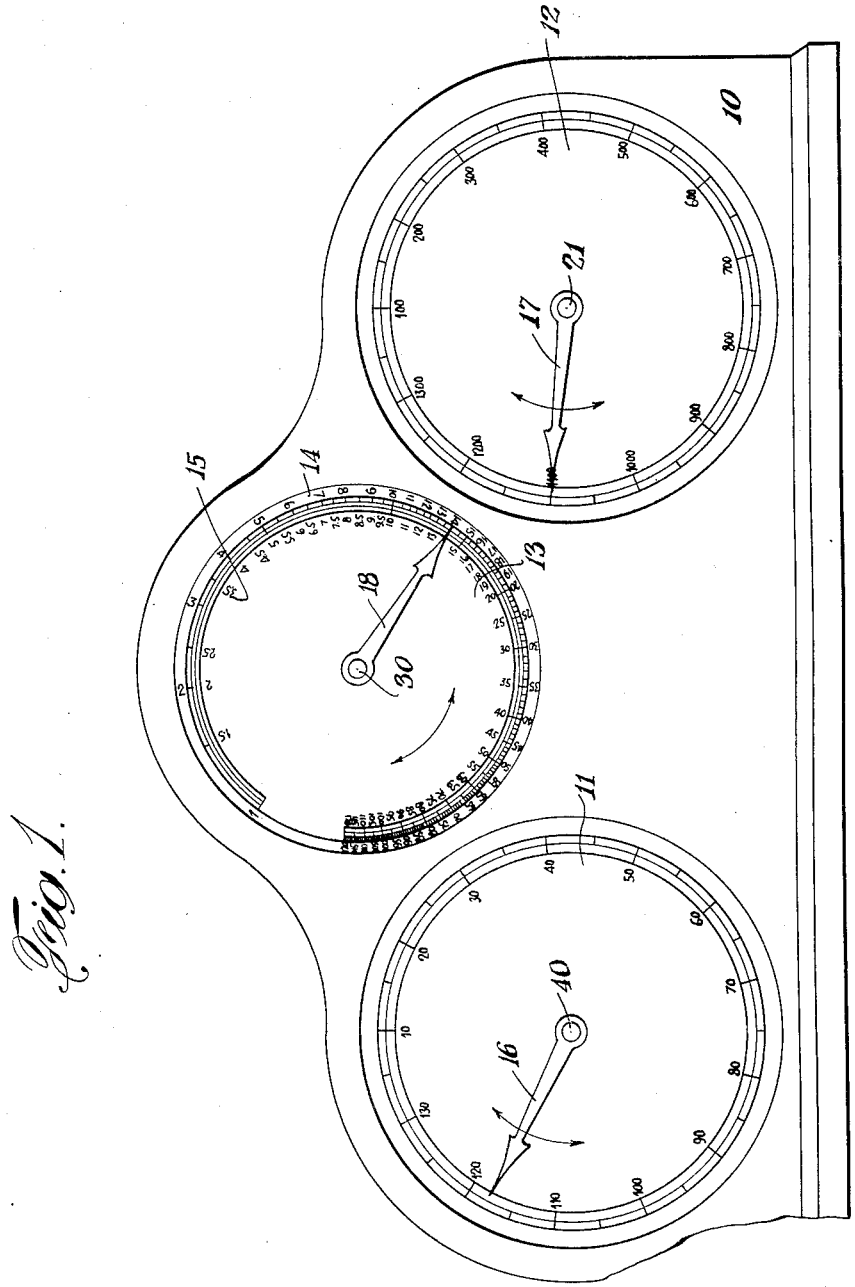
Figure 1 is a broken front elevation of an apparatus embodying my invention.

As shown, I provide a suitable containing casing 10 with a torque dial 11 thereon suitably graduated, a tachometer or speed indicating dial 12 also suitably marked, and a horse power indicator having a dial 13 and with graduations 14 near the periphery of the dial. The numbering on the dial 13 may be duplicated if desired and arranged for easy reading as at 14 and 15. The dial 13 is adapted to revolve whereas the dials 11 and 12 remain stationary. The dials coact with the indicating pointers, the pointer 16 operating with the dial 11, the pointer 17 with the dial 12 and the pointer 18 with the dial 13.

On the back of the dial 12 is a frame 19 and a suitable bracket 20 supporting the shaft 21 which carries the pointer 17 and which may have a suitable connection with the tachometer. The shaft 21 has a driving pulley 22 which has a belt connection with another pulley 23. This pulley is carried by a shaft 25 journaled on the bracket 24. The shaft 25 also carries a cam 26 which frictionally engages the lower end of a suitably guided follower 27. The follower is connected to a belt 28 which extends around the pulley 29 on the shaft 30 which carries pointer 18 of the horse power indicator. The belt 28 may be given two or three windings on the pulley to insure that the linear movement of the belt will impart proper rotary movement to the pulley. The shaft 30 is supported in a bracket 31 on the frame 32 on the back of the horse power indicator. The belt 28 extends downward from the pulley 29, passes over the guide pulley 33 on the bracket 34, through a guide 35 in the lower end of the follower 27, thence over the guide pulley 36, also on said bracket 34. The free end of this belt 28 is provided with a weight 37 to keep the belt taut. Thus the movement of the shaft 21 will impart a movement to the cam 26 which movement will of course correspond to the angular displacement of the shaft 21 and pointer 17. As the cam 26 moves, it will move the follower 27, which by means of the belt 28, will impart movement to the shaft 30 and the hand 18 of the horse power dial 13.

On the back of the torque indicator is a frame 38 carrying a bracket 39 which supports the shaft 40 of the torque indicator. This shaft is connected by a belt 41 and a pulley 41ᵃ with the pulley 22′ carrying a cam 26′. The arrangement shown is a duplicate of the driving mechanism already described for turning the hand of the horse power indicator, the reference numerals being the same except for the addition of a prime mark. The connection from follower 27′ is with a pulley 30′ on the hub 42 which is journaled on the shaft 30. This hub 42 carries the dial 13 of the horse power meter.

The cams 26 and 26′ whose movement is caused by the movement of the speed and torque indicators, impart to followers 27 and 27′ and so to hand 18 and dial 13, a displacement which is directly proportional to the logarithms, to the same scale, of the speed value and torque value respectively. The dial 13 is logarithmically graduated to the same base. With increasing speed and torque, the dial and the pointer move in opposite directions adding the logarithms of the two components and give graphically the product of the two components, the calibration being such as to care for any desired constant multiplying or dividing factors.

It will be noticed that the shafts 21 and 40 do not rotate constantly, but oscillate to express the speed or torque of the respective meters, and that as these shafts oscillate, the logarithmic cams 26 and 26′ will correspondingly oscillate.

It will be further noticed by reference to Fig. 2, that as the shaft 21 moves, it will impart a movement to the pulley 23 and cam 26 which will move the follower 27. The weights 37 and 37′ will take up the slack of the belt 28 and 28′ respectively. A corresponding movement of the cam 26′ will be transferred to the dial of the horse power indicator and move it in the opposite direction.

It should be noticed that there is a straight line motion along 28 and 28′, which motion is proportional to the logarithm of the values of the factors which cause rotations of the cams 26 and 26′ respectively. As already pointed out, the motions along the lines 28 and 28′ are transferred to the pointer and dial respectively. It is essential to the operation that the motions between the cams and the pointer and dial be straight line motions, for otherwise the logarithmic values would not be added or subtracted. However, the motions between the individual factor indicators, in this case, the torque indicator 11 and the tachometer 12 and the pulleys 23 and 23′ need not be straight line motion. The pulleys 22 and 41ᵃ may be cams, for example and in this way take care of certain other factors besides the ones indicated by the pointers 16 and 17.

This device is adaptable for use as a counting means. In such a use one dial, for example, 12 could be set manually to the number of elements per pound and the dial 11 operated by the weight of the elements being counted. The dial 13 would then indicate the total number of elements.

This device can also be used as a total price indicating means. The dial 11 may be operated by the weight of the material to be dispensed and the dial 12 may be manually set to the rate per pound, for example. The dial 13 would then indicate the total price.

It will be apparent to those skilled in the art that many other applications may be made of my device. There are many modifications which may be made in my device without departing from the spirit of the invention. I therefore, do not wish to be limited by the specification and drawings, but only by the appended claim.

This application is a continuation of my co-pending application, Serial No. 70,424 filed November 20, 1925.

What I claim is:

A device for continuously indicating a result from two factors comprising a plurality of reactive devices, an indicator having independently movable parts, a first logarithmic cam adapted to cooperate with one of said reactive devices and with one of said movable indicator parts, a second logarithmic cam adapted to cooperate with a second reactive device and a second movable indicator part, means for imparting straight line motion between said first reactive device and co-operating logarithmic cam comprising a belt and pulley connection between said first logarithmic cam and reactive device, means for imparting straight line motion between said second reactive device and co-operating logarithmic cam comprising a belt and pulley connection between said second reactive device and logarithmic cam, a follower operating against said first cam and connected to said first movable indicator part, and a follower operating against said second cam and connected to said second movable indicator part whereby said indicator is adapted to indicate the arithmetical resultant of said logarithmic movements.

ROBERT B. WASSON.